April 1, 1958  O. O. BLACKMAN  2,828,973
TWO WHEEL TRAILER DOLLY
Filed March 30, 1955  2 Sheets-Sheet 1
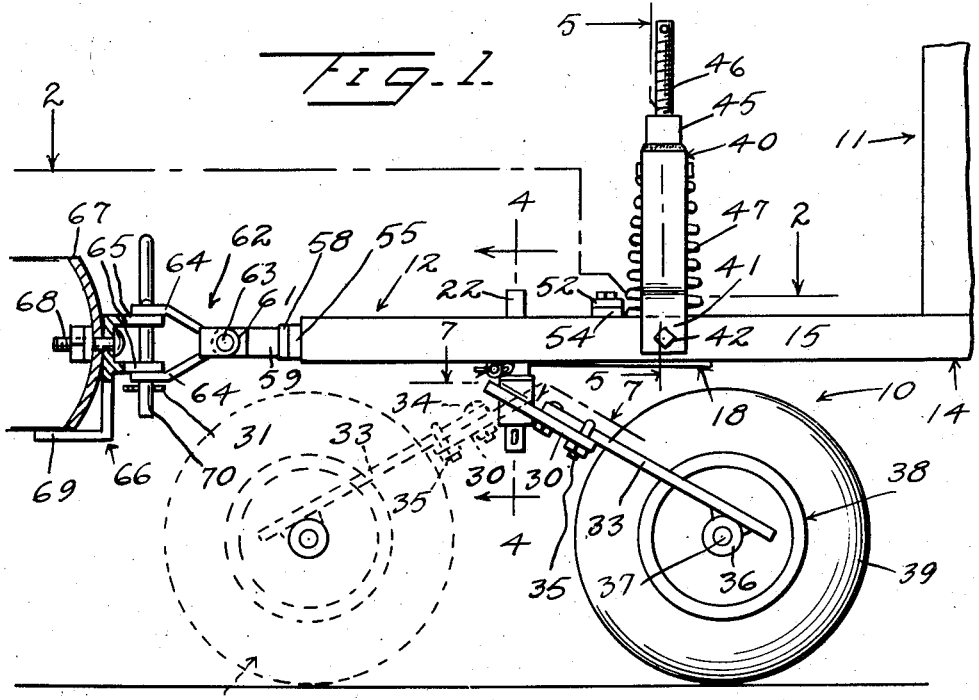
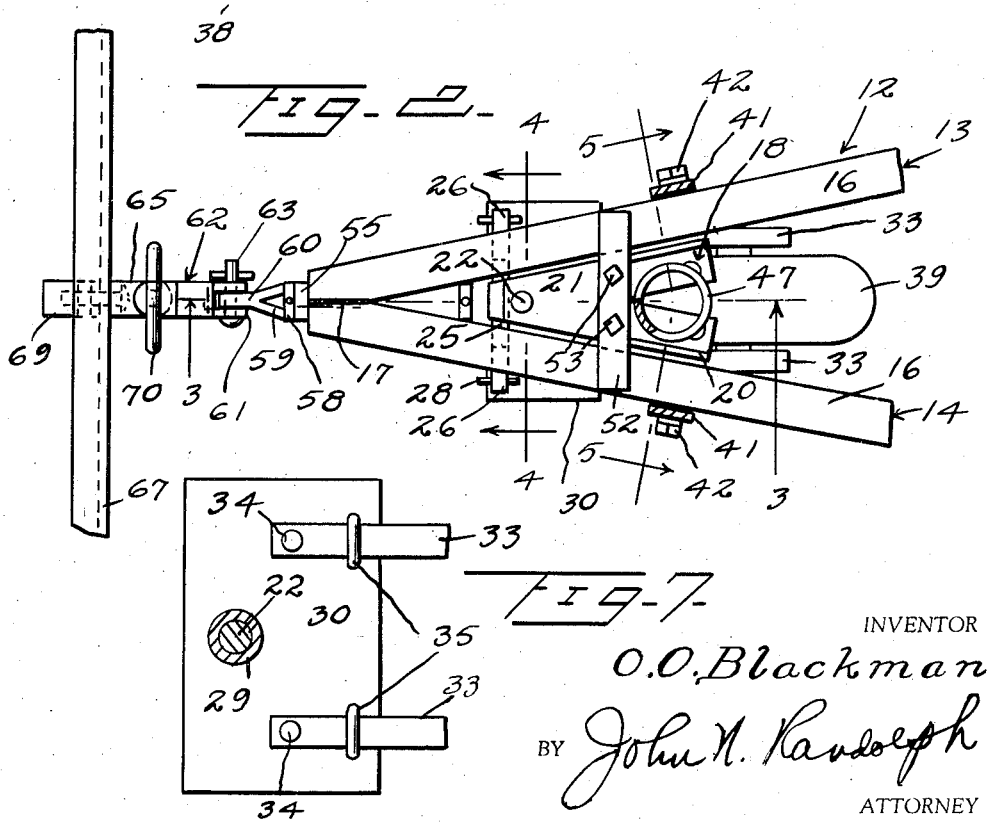
INVENTOR
O. O. Blackman
BY John N. Randolph
ATTORNEY

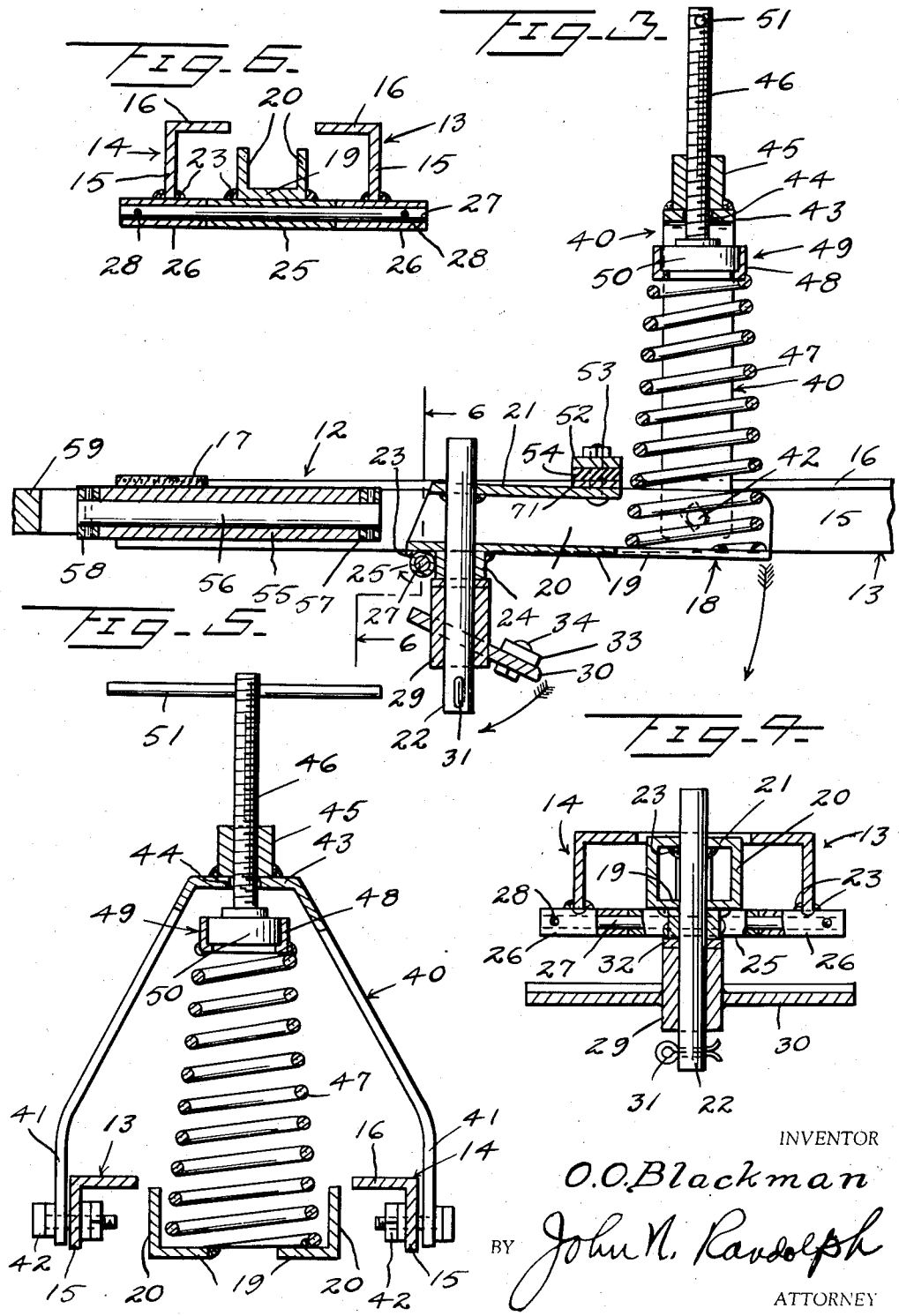

United States Patent Office 2,828,973
Patented Apr. 1, 1958

2,828,973

TWO WHEEL TRAILER DOLLY

Oddes O. Blackman, Zwolle, La.

Application March 30, 1955, Serial No. 497,917

6 Claims. (Cl. 280—476)

This invention relates to a dolly for two wheel trailers and has for its primary object to provide a dolly unit capable of being readily attached to a tongue portion of a two wheel trailer to provide a resilient support for the forward end of the trailer and which will effectively function to relieve a draft vehicle from the weight of the forward end of the trailer and which will additionally provide a parking stand to support the front end of the trailer when uncoupled.

Another object of the invention is to provide a dolly unit having a readily adjustable spring suspension system capable of being manually adjusted easily for raising or lowering the draft tongue of the trailer to enable the coupling part of the tongue to be disposed at a proper level to be readily coupled with or uncoupled from a coupling part of a draft vehicle irrespective of the elevation thereof.

A further object of the invention is to provide a dolly unit including a caster wheel which is yieldably disposed beneath a trailer tongue to enable it to readily pass over obstructions, which will not interfere with guiding the trailer while being backed, and which is capable of supporting the forward end of the trailer while the trailer is being moved rearward.

Still another object of the invention is to provide a dolly capable of being readily mounted on existing two wheel trailers.

Various other objects and advantages of the invention will hereinafter become more fully apparent from the following description of the drawings, illustrating a presently preferred embodiment thereof, and wherein:

Figure 1 is a side elevational view showing the dolly applied to the forward part of a two wheel trailer;

Figure 2 is a horizontal sectional view thereof, taken substantially along a plane as indicated by the line 2—2 of Figure 1;

Figure 3 is an enlarged fragmentary vertical sectional view, taken substantially along a plane as indicated by the line 3—3 of Figure 2;

Figures 4 and 5 are enlarged fragmentary detail cross sectional views taken substantially along planes as indicated by the lines 4—4 and 5—5, respectively, of Figures 1 and 2;

Figure 6 is a detail cross sectional view, taken substantially along a plane as indicated by the line 6—6 of Figure 3, and Figure 7 is an enlarged, substantially horizontal sectional view, taken substantially along a plane as indicated by the line 7—7 of Figure 1.

Referring more specifically to the drawings, the trailer dolly in its entirety and comprising the invention is designated generally 10. To illustrate a preferred application and use of the trailer dolly 10, the forward part of a two wheel trailer 11 has been illustrated in the drawings, said trailer 11 being of a conventional construction having its two ground engaging wheels, not shown, disposed in transverse alignment and rearwardly of the balance point of the trailer 11, so that the forward end of the trailer will normally swing downwardly. The trailer 11 includes a tongue 12 composed of forwardly converging bars 13 and 14, as best seen in Figure 2, each of which is formed of angle iron and includes a vertical outer flange 15 and inwardly extending horizontal top flange 16. The top flanges 16 merge at the forward end of the tongue 12 and are suitably secured together, as by means of welding, as seen at 17.

The front end supporting dolly 10 includes a frame, designated generally 18, which tapers longitudinally from its rear toward its forward end and which includes a bottom 19, forwardly converging side walls 20 and a top wall 21. The top wall 21 extends from adjacent the forward end of the frame 18 and terminates approximately intermediate of the ends of said frame, as best seen in Figure 3. A kingpin 22 extends through the bottom wall 19 and top wall 21, adjacent the forward end of the frame 18, and is disposed with its axis at a right angle to the longitudinal axis of said frame. The kingpin 22 is secured immovably to the frame 18, as by welding, as seen at 23. A boss 24 is secured to the underside of the bottom 19 and is disposed around the kingpin 22. A bearing 25 is secured as by additional welding as seen at 23 to the underside of the forward end of the bottom 19 and to a forward part of the boss 24 and is disposed crosswise of the frame 18. As best seen in Figure 6, a pair of bearings or bushings 26 are secured in transverse alignment with one another, as by additional welding 23, to portions of the bottom edges of the vertical flanges 15 of the tongue members 13 and 14. The bearings 25 fits turnably between the bushings 26 and a pin or axle 27 extends through the bearing 25 and bushings 26 and provides a journal for said bearing, whereby the frame 18 is mounted for swinging movement vertically in the tongue 12. The pin or axle 27 can be secured by fastenings 28 to one or both of the bushings 26.

A sleeve 29 extends through and is suitably secured in a plate 30. The sleeve 29 is disposed with its axis at an oblique angle to the plane of the plate 30. The sleeve 29 swivelly engages the knigpin 22, below the boss 24, and is retained applied thereto in any suitable manner as by means of a cotter pin 31, which extends through the kingpin 22, adjacent its lower end and beneath the sleeve 29, as best seen in Figures 3 and 4. A thrust washer 32 is preferably mounted on the kingpin 22 between the boss 24 and the upper end of the sleeve 29. A pair of bars 33 have corresponding ends disposed on the plate 30. Each of said bar ends is secured to the plate 30 by a nut and bolt fastening 34 and by a U bolt and nut fastening 35, to prevent the bars 33 from sliding or swinging relatively to the plate 30. The bars 33 are secured to the plate 30 near its side edges and project from the lower edge thereof, as seen in Figure 1. The sleeve 29 is disposed intermediate of the side edges of the plate 30 and near its upper edge. The bars 33 are disposed substantially parallel to one another and combine with the plate 30 and sleeve 29 to form a caster wheel fork. The bars 33, near their lower free ends, have bearings 36 secured thereto and which are disposed in alignment to receive end portions of a wheel axle 37, which extends through and provides a journal for a wheel 38, which is thus journaled in the wheel fork 30, 33. The wheel 38 is preferably equipped with a pneumatic tire 39.

The frame 18 extends rearwardly from its pivot 27 and is of a width to fit swingably between the tongue portions 13 and 14, as best seen in Figures 2 and 5. A yoke 40 is disposed over the rear end of the frame 18 and has depending legs the terminal portions 41 of which loosely straddle portions of the tongue parts 13 and 14 and are pivotally connected thereto by nut and bolt fastenings 42 which extend through the flanges 15 thereof and loosely through said leg portions 41. The yoke 40 has a substantially flat horizontal top portion 43 provided with an opening 44, and which is disposed substantially above the level of the tongue 12. An internally threaded boss 45 is mounted on and suitably secured to the top portion 43. A screw 46 extends threadedly through the boss 45 and loosely through the opening 44. A relatively heavy coil spring 47 has a lower end disposed in the rear portion of the frame 18 and suitably secured to the frame bottom 19. The spring 47 extends upwardly from the rear end of the frame 18 within the yoke 40 and the upper end thereof is suitably secured to an outer section 48 of a bearing 49. The bearing 49 has an inner section 50 swively mounted in the outer section 48 and to which the lower end of the screw 46 is connected. An elongated handle 51 extends transversely through and may be removably mounted in the screw 46, adjacent the upper end thereof and is adapted to be manually engaged for turning the screw 46 in either direction.

A bar 52 is secured by nut and bolt fastenings 53 to the rear end portion of the top wall 21 and is disposed transversely thereof and substantially to the rear of the frame pivot 27. A strip of cushioning material 54 is secured to the underside of the bar 52 and extends substantially from end-to-end thereof. The bar 52 and strip 54 form a stop and the ends thereof overlie portions of the top flanges 16 of the tongue parts 13 and 14, as seen in Figure 2, for a purpose that will hereinafter be described.

A sleeve 55 is disposed in the forward end of the tongue 12, between the flanges 15 and beneath the flanges 16, and is secured to the tongue by welds 17. The sleeve 55 is disposed axially of the tongue 12 and has a forward end extending slightly beyond the forward end of said tongue. A shaft or pin 56 extends through and is swively disposed in the sleeve 55 and is maintained in engagement therewith by thrust collars 57 and 58, which are detachably secured to the ends of the pin 56 and which bear against the ends of the sleeve 55. The forward thrust collar 58 is provided with a forwardly projecting extension 59 which terminates in an eye 60. The eye 60 fits loosely in a bifurcated shank end 61 of a fork member 62 and is pivotally and detachably connected thereto by a pivot fastening 63 which extends through the bifurcated portion 61 and through the eye 60. The fork 62 has forwardly projecting spaced prongs or arms 64 which are adapted to loosely straddle a pair of arms 65 of a coupling section 66. The coupling section 66 comprises a bar from which the arms 65 project. The coupler 66 is adapted to be mounted, for example, on the rear bumper 67 of a vehicle, not shown, such as an automobile, constituting the draft vehicle for the trailer 11, and is secured to the outer side of the bumper 67 and intermediate of its ends by a nut and bolt fastening 68, which extends through the bar, between the arms 65, and through the bumper 67. The bar of the coupler section 66, remote from the arms 65, has a laterally turned terminal portion 69 which is shown engaging under the bottom edge of the bumper 67 to prevent the coupler section 66 from turning relative to the bumper. The arms 65 are thus maintained in vertically spaced relation to one another. Said arms and the fork arms or prongs 64 have registering openings, not shown, through which a coupling pin 70 detachably extends for coupling the trailer vehicle 11 to the bumper 67. It will be readily apparent that the coupling pin 70 provides a pivot permitting the fork 62 to swing horizontally relative to the coupling section 66 and the pivot 63 allows the tongue 12 to pivot vertically relative to the fork 62. Additionally, the swivel connection of the pin or shaft 56 in the sleeve 55 permits the collar extension 59 and the fork 62 to swivel relative to the tongue 12 or vice versa, thus providing a universal connection between the trailer vehicle 11 and the bumper 67.

The swivel engagement of the sleeve 29 with the kingpin 22 permits the caster wheel fork 30, 33 to revolve through an arc of 360° relative to the frame 18. Accordingly, when the trailer 11 is being drawn forwardly or from right to left as seen in Figures 1 and 2, the caster wheel 38 will assume a position as seen in full lines in Figure 1 and in Figure 2, beneath the tongue 12 and the dolly frame 18 and behind the kingpin 22. The tension of the spring 47 can be adjusted by manually turning the screw 46 to either raise or lower the frame 18 and the wheel fork 30, 33. If necessary, a plurality of spacing elements or washers 71, as seen in Figure 3, may be interposed between the top wall 21 and the cushioning strip 54 for elevating the stop 52, 54 relative to the frame 18 to permit the caster wheel 38 to be swung downwardly relative to the tongue 12, below its position of Figure 1, where the coupling part of the draft vehicle is at a higher elevation than as shown in Figure 1. It will thus be seen that the unit 10 provides a spring suspension for supporting the weight of the forward end of the trailer 11 when in transit to remove this weight from the connection of the trailer tongue to the draft vehicle, and additionally provides a parking stand when the trailer is uncoupled. Adjustment of the screw 46 also enables the fork 62 to be positioned at a proper elevation for coupling to a draft vehicle thereby eliminating the need for lifting the forward end of the trailer when coupling the trailer to a draft vehicle.

The front end suspension unit or dolly 10 will effectively support the forward end of the trailer 11 while being drawn forwardly. The wheel 38 in passing over high spots on a roadway may yield upwardly relative to the tongue 12. When this occurs, the frame 18 will swing upwardly in the tongue 12 counterclockwise as seen in Figure 1 about its pivot 27 thereby further compressing the spring 47. After the wheel 38 passes over the high spot, the spring 47 will return the unit to its normal position. The yoke 40 is swingably mounted by the fastenings 42 on the tongue 12 for swinging movement longitudinally of the tongue. Thus, as the frame 18 is swung upwardly the yoke 40 can swing forwardly so that the spring will remain in alignment with the screw 46 and will not be laterally distorted by up and down movement of the frame 18.

The unit 10 will not interfere with backing the trailer 11 while hitched to a draft vehicle. When the trailer is backed, the fork sleeve 29 will swivel on the kingpin 22 to permit the wheel 38 to assume its dotted line position of Figure 1 beneath the forward end of the tongue 12 and forwardly of the kingpin 22. The stop 52, 54 will then function to prevent the frame 18 from rocking downwardly below its position of Figure 1 and so that the front end of the trailer 11 will still be supported by the unit 10.

Various modifications and changes are contemplated and may obviously be resorted to, without departing from the spirit or scope of the invention as hereinafter defined by the appended claims.

I claim as my invention:

1. A front end dolly for two wheel trailers comprising, in combination with a two wheel trailer having a rigid forwardly extending draft tongue including a forward end adapted to be coupled to a draft vehicle and provided with tongue members having laterally spaced portions, an elongated dolly frame loosely disposed between said tongue portions and longitudinally of the tongue, means pivotally connecting a forward end of the frame to the tongue for up and down swinging movement of the frame relative to the tongue, a kingpin secured to and extending vertically through the frame near the forward end thereof, a caster wheel fork swivelly connected to the kingpin beneath the frame and tongue, a ground engaging wheel journaled in said wheel fork, a yoke disposed over a rear end portion of said frame and over a part of the tongue and having end portions straddling parts of said tongue portions, means connecting said yoke to said parts of the tongue portions, a spring stop mounted in the upper part of said yoke, and an expansion coil spring having a lower end bearing on the rear portion of the frame and an upper end bearing against the spring stop for yieldably supporting the tongue and the forward part of the trailer on said dolly frame when the wheel fork and wheel are disposed beneath the frame, said spring extending upwardly from the frame between said tongue portions and within the yoke.

2. A front end dolly as in claim 1, and means adjustably mounting said spring stop in the yoke for adjustment thereof toward and away from the tongue and dolly frame for tensioning said spring for raising and lowering the tongue relative to the dolly frame.

3. A front end dolly as in claim 2, said last mentioned means comprising a feed screw extending threadedly through the upper portion of the yoke and connected to a part of said spring stop for swivel movement relative to another part of the spring stop engaged by said spring, said screw being adapted to be manually rotated for moving the spring stop toward and away from the dolly frame.

4. A front end dolly as in claim 3, said means connecting the yoke to the tongue portions constituting pivots on which said yoke is swingably mounted for lengthwise swinging movement relative to the tongue for maintaining the spring in substantially axial alignment with said screw in different adjusted positions of the frame to prevent distortion of the spring.

5. A front end dolly as in claim 1, an abutment means carried by the frame and engaging the tongue to limit downward swinging movement of the frame relative to the tongue for supporting the weight of the tongue and the forward end of the trailer on the dolly when the wheel and fork are swung to a position forwardly of the kingpin in backing the trailer.

6. A front end dolly as in claim 1, said fork comprising a plate, a sleeve extending through and secured in said plate and disposed with its axis at an oblique angle to the plane of the plate, said sleeve swivelly engaging the kingpin for supporting said plate at an incline downwardly and away from the sleeve, and said fork including a pair of fork arms fixed to said plate and projecting outwardly from the lower edge thereof and in which said wheel is journalled.

References Cited in the file of this patent
UNITED STATES PATENTS

| | | |
|---|---|---|
| 2,411,009 | Slimp | Nov. 12, 1946 |
| 2,496,515 | Boyes | Feb. 7, 1950 |
| 2,523,210 | Hedgpeth | Sept. 19, 1950 |
| 2,534,575 | Conley et al. | Dec. 19, 1950 |
| 2,639,159 | Milligan et al. | May 19, 1953 |